United States Patent [19]

Mastromatteo

[11] 4,265,389
[45] May 5, 1981

[54] METHOD OF WELDING A DIAPHRAGM ASSEMBLY

[76] Inventor: Michael Mastromatteo, 53B Ridge Rd., Valley Cottage, N.Y. 10989

[21] Appl. No.: 956,229

[22] Filed: Oct. 30, 1978

[51] Int. Cl.³ ................. B23K 15/00; B23K 9/00
[52] U.S. Cl. ............................................ 228/219
[58] Field of Search ............. 228/219, 221, 182; 73/706, 707, 715, 716, 718; 92/91, 98

[56] References Cited

U.S. PATENT DOCUMENTS

| | | | |
|---|---|---|---|
| 2,841,984 | 7/1958 | Green | 73/706 |
| 3,458,683 | 7/1969 | Canonico et al. | 219/121 |
| 3,793,885 | 2/1974 | Frick | 73/718 |
| 4,158,311 | 6/1979 | Yasuhara et al. | 73/718 |

*Primary Examiner*—Kenneth J. Ramsey
*Attorney, Agent, or Firm*—Philip Furgang

[57] ABSTRACT

Disclosed is a method of welding a diaphragm to the housing sections of a diaphragm-controlled device. The diaphragm and housings are first clamped together to provide a component of force perpendicular to the areas or seat of the housing which hold the diaphragm. An electron beam directed at, above, and below the sandwich edge of the housing and diaphragm causes a weld to be formed in a portion of the seat. The clamping pressure and expansion of the liquified metal forces part of the metal out of the sandwiched area such that, upon cooling, the housings are brought together against the diaphragm in a secure and pressure-tight weld. In order to weld in a vacuum chamber, it is necessary to remove the gases in the chamber. Diaphragm devices are characterized by the housing having a cavity therein and the diaphragm dividing the cavity into two chambers. Gas evacuation and re-introduction must be controlled to avoid unwanted diaphragm distortion. This is accomplished by providing portals into the housing chambers which are proportional to the volumes therein. The gases thereby pass into and out of the chambers at a rate proportional to the volume, thereby maintaining equal pressures in the housing chambers.

3 Claims, 9 Drawing Figures

METHOD OF WELDING A DIAPHRAGM ASSEMBLY

BACKGROUND OF THE INVENTION

This invention relates to a method of welding and, more particularly, a method of welding together to form a leak-proof and pressure-resistant seal of a member sandwiched between two weldable metallic work pieces.

The method of this invention has particular applicability to the assembly of devices intended to communicate pressure in fluid pressure-operated devices. Such devices are intended to transmit liquid or gas pressure, control the flow of liquids in hydraulic systems, prevent the extensive loss of liquids or gases in ruptured hydraulic or gaseous systems, and transmit pressure of liquids, solids, or gases to such liquid or gas-operated instruments as pressure gauges, indicators, recorders, pressure transmitters, flow valves, or the like. Examples of such devices are shown in U.S. Pat. No. 4,111,056 by the applicant herein; by Green in U.S. Pat. No. 2,841,984; Bissell et al. in U.S. Pat. No. 3,202,063; and the like.

Such devices have in common a housing. The housing has therein a cavity. A diaphragm is within the housing cavity and divides the cavity into two chambers. The diaphragm is secured between sections of the housing. The securing of the diaphragm to the housing is of much concern.

One essential characteristic of such devices is that the diaphragm be held so securely in place that the fluid pressures upon the diaphragm will not break the diaphragm loose from the housing nor cause a rupture or leak in the housing at the juncture of the housing and diapgragm. It is also important that, when the housing and diaphragm are assembled, the diaphragm not be distorted by the joining process itself.

In the past, a number of proposals have been made to secure diaphragms in housings. Such methods of joining generally include welding, braising, or soldering. Thus, for example, Akeley, in U.S. Pat. No. 4,046,010, discloses a method of combining a diaphragm made of tantalum with a stainless steel weld ring and one side of a housing made of stainless steel. The stainless steel weld ring is welded directly to the stainless steel housing at a temperature above the melting point of the stainless steel, but below the melting point of the tantalum, whereby, simultaneously to the welding of the weld ring to the body, a braise is created between the tantalum diaphragm and both the stainless steel weld ring and the stainless steel body. However, the device taught by Akeley does not provide for a pressure-resistant seal, since the joining of the diaphragm to the weld ring and lower housing is the only connection. A braised joining is clearly weaker than welding, which is performed at much higher temperatures. Further, the upper housing of the device taught by Akeley abuts the weld ring and is merely clamped to the lower housing. It should be noted that Akeley requires the use of an elastomeric seal to buffer or keep the materials within the housing chamber from contacting the weld ring. The reason for this is that the weld ring is sensitive to, and may be corroded by, the substances within the chamber. It is clear, of course, that seals are subject to failure and that braising the diaphragm to a weld ring on only one side of a housing does not provide for a strong pressure-tight seal.

Another approach to joining a thin diaphragm to a housing is taught by Canonico et al. in U.S. Pat. No. 3,458,683. Canonico et al. discloses a thin metal foil positioned in a sandwich structure which is in face contact between the bottom metallic work piece and the top metallic retaining member. The sandwich-type structures are secured together by passing electron beams simultaneously through the top retaining member in a metallic foil and bottom work piece. Canonico et al. suggests that the foil member may be made of a material which is metallurgically incompatible with the top retaining member or bottom work piece, and particularly refers to the use of such materials as tantalum and the like. However, the weldment taught by Canonico et al. is perpendicular to the mating area before the foil and the housing. Accordingly, a pressure weld is not formed. In a setting of a pressure transducer or valve, pressure at the edges would become points of failure.

Further, it has been observed that prior consideration of welding techniques has specified that, in order to form a strong metallurgical bond, the mating surfaces must be placed into intimate contact and the weld strength be proportional to the surface areas joined and to the intimacy of contact. However, other characteristics are believed not to have been taken into account in the prior art devices. These observed characteristics, as more fully discussed hereinafter, may be employed to provide a pressure and seal tight weld. The disadvantages heretofore experienced of weak welds and the welding of dissimilar materials is, therefore, overcome.

SUMMARY OF THE INVENTION

It is an object of this invention to provide a method of welding a diaphragm to a housing wherein the diaphragm is sandwiched between two housing members;

it is an object of this invention to provide a method of welding, including the welding of dissimilar metals, which is inexpensive, efficient, and simple in effectuation;

it is an object of this invention to provide a method of welding a diaphragm to a housing and in which the diaphragm separates the housing into two chambers and in which the diaphragm is disposed in a vacuum chamber and in which gases are removed from the housing chambers without undesired distortion of the diaphragm;

it is an object of this invention to provide an improved method for welding thin diaphragms to another metal member;

it is another object of this invention to provide an improved method for welding thin diaphragms to another metal member when the two are metallurgically incompatible.

Other objects and advantages of the present invention will become apparent upon the reading of the following description thereof.

In accordance with the teachings of this invention, the method of welding comprises the steps of: providing at least two metallic work pieces; providing a member; sandwiching the member between the metallic work pieces; the juncture of the member and pieces defining the adjoining edges; selectively melting the metallic work pieces along their respective adjoining edges of the sandwich, thereby expanding the liquid metal; forcing the liquified metal of the metallic work pieces out of the sandwiches at the edges; and cooling the liquified portions of the work pieces to thereby cause the work pieces to solidify and draw together, thereby forming an impenetrable seal and pressure-resistent weld.

In another aspect of this invention, there is provided the method of welding in a vacuum chamber comprising providing a housing having a cavity therein. The housing is in two sections. There is further provided a diaphragm within the housing cavity. The diaphragm divides the cavity into two housing chambers. The combined housing and diaphragm are disposed in a vacuum chamber. Gases are evacuated from the vacuum chamber; pressures are maintained in each housing chamber in a predetermined relationship to one another during the gas evacuation and re-entry cycles to maintain the diaphragm in a predetermined position relative to the housing.

DESCRIPTION OF THE PREFERRED EMBODIMENTS

Figure 1:
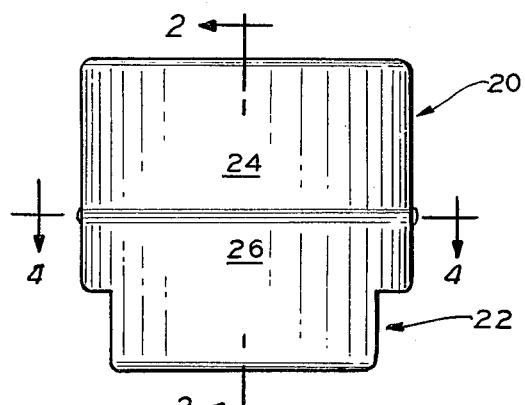
FIG. 1 is a plan side view of a control device welded in accordance with the teachings of this invention.

Turning now to the drawing, there is generally disclosed a diaphragm seal 20. This device 20 is used to exemplify the welding method of this invention and is not restricted solely to seals. The diaphragm seal 20 may generally comprise a housing 22. The housing 22 may, in turn, be in two sections: an upper housing section 24 and a lower housing section 26.

Figure 2:
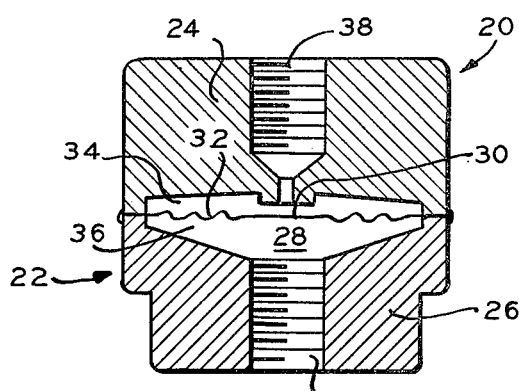
FIG. 2 is a sectional schematic view of the device of FIG. 1, taken along lines 2—2.

The housing 22 may typically have, as shown here, a generally cylindrical shape, with the upper and lower housing sections 24 and 26 comprising substantially equal axial portions of the cylinder. The upper and lower housing sections 24 and 26 in cross section may have any convenient shape, such as circular, and may have formed therein radially extending depressions which, when joined, form a cavity 28 (FIG. 2). It will be noted that the cavity 28 may have a generally symmetrical shape extending radially from the axial center of the housing 22. Preferably, this shape is circular in cross section. A diaphragm 30 may be disposed within the cavity 28. The diaphragm 30 may be made of any well known flexible material, such as Teflon, rubber, or a thin planar sheet metal having therein a plurality of concentric corrugations 32 which extend uniformly both above and below the plane of the diaphragm 30. The diaphragm 30 is held in place by being sandwiched between the upper and lower housing sections 24 and 26, respectively. The diaphragm 30 divides the cavity 28 into upper and lower housing chambers 34 and 36, respectively. An upper housing port 38 may extend through the upper housing section 24 and into the upper housing chamber 34. A lower housing port 40 may extend through the lower housing 26 into the lower chamber 36. In general use, such a seal admits a process through the lower hosing port 40 and into the lower chamber 36 of the cavity 28. In general use, the upper chamber 38 is filled with a liquid which communicates through the upper housing port 38 to a meter (not shown). The process, which may be a liquid, gas, or semi-solid, is inserted into the lower chamber 36. In diaphragm seal devices, the pressure exerted by the process is against the diaphragm which, in turn, transmits the pressure to the meter. In circumstances such as this, as in other devices that join a diagphragm member to a housing, it is essentail that, at the juncture of the diaphragm 30 and the upper and lower housing 34 and 36, there must be both a leak-proof and pressure-resistant engagement. To accomplish such a seal and pressure-resistant connection, a method of welding is applied.

Figure 3:
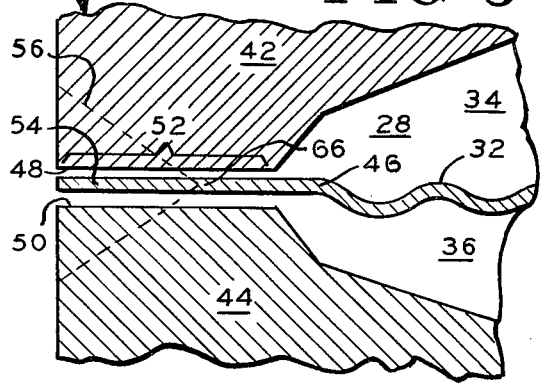
FIG. 3 is a diagrammatic sectional and enlarged view of the juncture of the diaphragm and housing sections of the device of FIG. 2 and constructed in accordance with the teachings of this invention.

Thus, there may be upper and lower housing sections 42 and 44, which are equivalent to the upper and lower housing sections 24 and 26, respectively, discussed above. It will be noted (FIG. 3) that disposed between the upper and lower housing sections 42 and 44 may be a diaphragm 46 which is similar in construction to the diaphragm 30 of the example of the assembled unit 20.

In the example presented here, the upper housing and lower housing sections 42 and 44, respectively, may have parallel and laterally extending surfaces 48 and 50, respectively. These surfaces 48 and 50 each define a housing seat 52. Sandwiched between these surfaces 48 and 50 may be a planar portion 54 of the diaphragm 46. The upper and lower housing sections 42 and 44 and diaphragm 46 may be of dissimilar materials. Thus, for example, the upper and lower housing sections 42 and 44, respectively may be made of steel, nickel, stainless steel, Monel, Hastelloy, or the like.

The parallel surfaces 48 and 50 of the upper and lower housing sections 42 and 44, respectively, are, preferably, planar, parallel, and with a smooth finish, as by a lapping, or the like. The housings 42 and 44, with the diaphragm 46 sandwiched therebetween, are, preferably, clamped with sufficient pressure to prevent any gaps or spaces between the housing or work pieces and member 42, 44, and 46, respectively. The clamping pressure should not be so great as to cause plastic flow of the diaphragm 46. The seal 20, or similar device, may then be welded with any suitable means, such as electron beam welding in a manner ordinarily known in the art. The beam is, preferably, directed parallel to the plane of the diaphragm 46. The angle of penetration and depth of penetration are indicated by the dashed lines 56. The clamping effect provides constant pressure perpendicular to the parallel surfaces 48 and 50. As the metals 42, 44, and 46 become molten, or liquid, in the volume of the electron beam 56, the clamping effect combined with the expansion effect of the liquified metal forces this molten metal outwardly from the housing 22. The electron beam is then removed and the rapid cooling causes a natural shrinkage or reduction in volume. This lost volume causes the entire assemblage of parts 42, 44 and 46 to be drawn together more tightly and securely than has heretofore been possible. In other words, the clamping pressure becomes an integral part of the device 20 to thereby form a seal and pressure-resistant weld.

Figure 4:
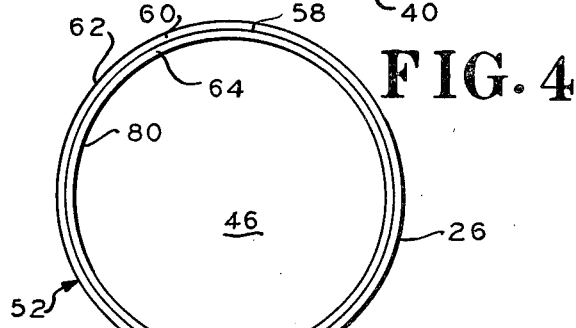
FIG. 4 is a section of the device of FIG. 1, taken along lines 4—4.

It is essential, in performing this welding, that the beam does not extend the full depth of the parallel surfaces 48 and 50 of the housing sections 42 and 44, respectively. Moreover, penetration of the electron beam is determined by the density of the object to be welded. If a beam is brought too close to the cavity 28, the beam may enter the cavity 28 and burn out the diaphragm 46. Thus, the preferred depth may be seen by the concentric circle 58 (FIG. 4). The area 60 is that portion subjected to welding and extends inwardly from the outer surface 62 of the housing 22. The area 64 is that portion of the seat 52 proximate to the cavity 28 which is not welded. Thus, the circle 58 is the preferable line of greatest depth of the weld and is coincident with the apex 66 of the dashed weld area 56 (FIG. 4).

Figure 5:
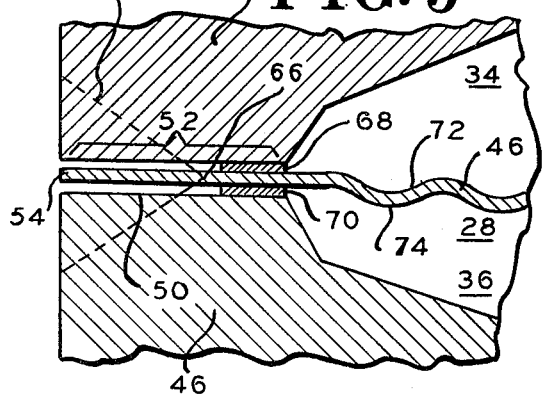
FIG. 5 is a diagrammatic sectional and enlarged view of another embodiment of the juncture of the diaphragm and housing portions constructed in accordance with the teachings of this invention.

Frequently, diahragms are provided with gaskets made of such materials as Teflon. Typically, Teflon is baked onto the diaphragm for use as an additional seal against leakage. Such a gasket may also be used to eliminate the step of lapping the opposed parallel housing surfaces. In addition, the use of Teflon, or the like, is frequently in connection with coating to protect diaphragms against the materials which come into the device cavity (FIG. 5). In order to effectuate the method of welding with coated gaskets, a diaphragm 46 may be provided with gaskets 68 and 70 on opposed sides 72 and 74, respectively, of the diaphragm 46. These opposed gaskets 68 and 70 are, preferably, located within the seating area 52 defined by the opposed parallel surfaces 48 and 50 of the upper and lower housing sections 42 and 44, respectively. In the alternative, only one of the gaskets 68 or 70 may be used. Preferably, the gasket coating should be secured, as by baking, or the like, onto the diaphragm 46 at a temperature of approximately 700° F. The gaskets 68 and 70, however, are spaced from the welding area 60, but within the seating area 62 at a point where the temperature of the electron beam is sufficiently low, so that the gaskest 68 and 70 will not be damaged. The welding step is then performed as before, and the resulting clamping pressure compresses the Teflon gaskets 68 and 70, creating the additional seal against leakage. It has been determined that the preferable thickness of the diaphragm 46 is 0.004 inches and that the coated area has an overall thickness of 0.005 inch. This allows a space of 0.001 inch for the compression of the Teflon gaskets 68 and 70. The Teflon gasket 68 and 70 is believed to compress at approximately 25% to 50% of its original thickness. This leaves approximately 0.0005 to 0.00075 inch space for the molten metal to flow into, causing additional weld shrinkage and greater pressure at the seal area 62.

Figure 6:
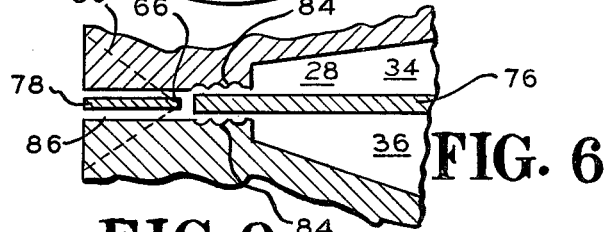
FIG. 6 is a diagrammatic sectional and enlarged view of another embodiment of the juncture of the diaphragm and housing portions constructed in accordance with the teachings of this invention.

On occasion, it may be desirable to use a diaphragm made of a non-weldable material, such as an elastomer of plastic. In order to provide the necessary welded-in clamping pressure, the diameter of the diaphragm 76 (FIG. 6) is smaller than the diameter of the diaphragm 46 discussed above. A wledable spacer ring 78 is disposed about the circumference of the diaphragm 76. As before, upper and lower housing sections 80 and 82, respectively, have parallel spaced, laterally extending surfaces 84 and 86, respectively, for engaging both the diaphragm 76 and the spacer ring 78.

The diaphragm 76 is, preferably, 0.001 inch thicker than the spacer ring 78. When the diaphragm 76 is provided with a baked-on gasket (not shown), the diaphragm total thickness should be approximately 0.0015 inch thicker than the spacer ring 78 to allow for gasket compression, as indicated above.

It is preferable that when non-metal diaphragms are employed, such as those made totally of Teflon, grooves 85 be provided in the non-welded seat area 64 to allow the material from the diaphragm 76 to flow therein during the compression phase of the welding. In addition, the diaphragm may be molded to have ridges that complement the grooves 85. In such circumstances, it is necessary that the diaphragm 76 be thicker than the spacer ring 78 so as to allow enough material to be clamped in the grooves 85 during the assembly and clamping operations. Welding may be accomplished in the same method as indicated above.

Figure 7:
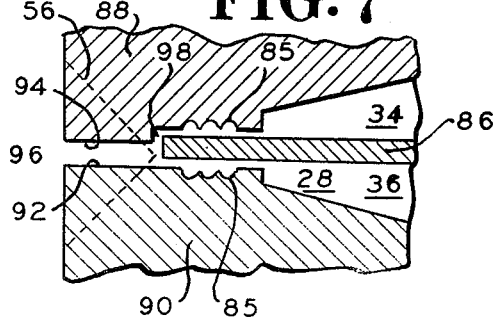
FIG. 7 is a diagrammatic sectional and enlarged view of another embodiment of the juncture of the diaphragm and housing portions constructed in accordance with the teachings of this invention.

In still another embodiment of this invention (FIG. 7), a diaphragm 86 may have a smaller diameter than the seat 52. The upper or lower housing sections 88 or 90, respectively—in this example, the upper housing section 88—may have a stepped configuration. Abutting parallel surfaces 90 and 92 of the sections 88 and 90 define the weld area 60. At the circumferential edge 96 of the diaphragm 86, the upper housing section 88 is stepped, thereby providing a complementary circumferential wall 98. This wall 98 and edge surface 96 abut at the line 58, demarcating the weldable from the non-weldable areas 60 and 64 of the housing seat 52. A maleable non-metallic diaphragm (not shown) may be accommodated and flowed into grooves 84 in the upper and lower housing sections 88 and 90, respectively. It is also belived possible to secure a flat, planar elastomer diaphragm in a similar manner.

The diaphragm 86 may be metallic foil. In such a case, the grooves 86 will not be necesssary. In this case, the preferred height or thickness of the step or wall 98 is 0.001 inch less than the thickness of the diaphragm 86 and is, preferably 0.01 inch greater in diameter. If, in this example, the diaphragm 86 is 0.004 inch thick, the depth of the recessed portion should be 0.003 inch thick. Sufficient clamping pressure should be applied to the diaphragm 86 to compress the metal foil so as to obtain the metal-to-metal contact for welding. During the clamping process, as the metal foil diaphragm 86 is compressed, it will expand outwardly into the extra space provided in the stepped area 64.

Figure 8:
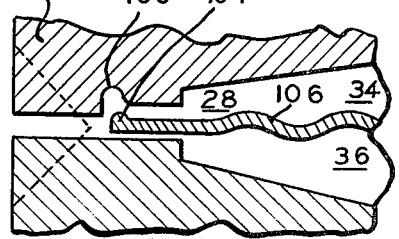
FIG. 8 is a diagrammatic sectional and enlarged view of another embodiment of the juncture of the diaphragm and housing portions constructed in accordance with the teachings of this invention.

As an alternative embodiment to the cast ridges 84 (see FIG. 6 for example), it is possible to provide an indentation or mating groove 100 in one of the housing sections13 in this case, the upper housing section 102—to match a molded rim portion 104 of a diaphragm 106 (FIG. 8).

One of the important features of this invention is the ability to weld together, by electron beam welding, a tantalum diaphragm to dissimilar metal housing. Using the configuration discussed in connection with FIG. 3, the electron beam welding is performed as discussed above. It is believed that molecules of the tantalum diaphragm 46 disperse in the steel housings 36 and 38, providing a strong weld. It is also understood that the precise shape of the weld is only for demonstrative purposes. It has been found, however, that the wider the weld (i.e., above and below the seat 52), the stronger will be the weld. Indeed, it has been observed that there are several features which are significant in controlling the strength of the weld and the integrity of the seal. Thus, the strength of a welded joint is found to be proportional to the suface areas joined, to the intimacy of the contact areas, the clamping pressure, the weld width, and the penetration depth. It is believed that the amount of clamping pressure necessary and width of the weld area at the entrance into the housing are two factors which have not been fully considered before and not taken fully into account until the method discussed hereinabove.

Figure 9:
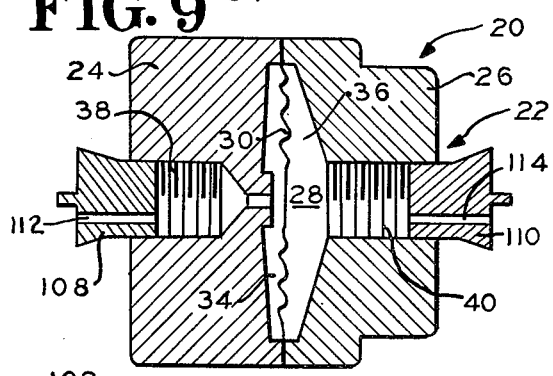
FIG. 9 is a diagrammatic view of an assembled housing for controlled welding in a vacuum in accordance with the teachings of this invention.

Still another difficulty in properly welding by the electron beam method is the necessity of removing gases from the welding chamber. The difficulty arising is that during gas removal, any differential pressure within the cavity 28 may cause the diaphragm 30 to move, thereby distorting and permanently damaging it. Control of the gas removing process is a method protecting the diaphragm 30. As shown (FIG. 9), the housing 22 is disposed with jigs or plugs 108 and 110 in the ports 38 and 40, respectively. The jigs 108 and 100 are intended for rotating the housing 22 during welding. It will be observed that the volume of the upper chamber 34 is smaller than the volume of the lower chamber 36. It is clear that the simultaneous removal of gases from both chambers 42 and 44 would cause an imbalance in the pressure in the cavity 28 and a distortion of the diaphragm 30. To overcome this, the jigs 108 and 110 are inserted into the ports 38 and 40. Apertures or flow holes 112 and 114 are provided in each of the jigs 108 and 110, respectively. The flow holes 112 and 114 are proportional to the desired flow of gases out of the cavity 28. Thus, for example, if the volume of the upper housing chamber 34 is half the size of the volume of the lower housing chamber 36, then the flow hole cross-section areas should have the same ratio. Conversely, if it is desired to position the diaphragm 30 in some other position than a planar position, that may be determined by adjusting the relative size of the flow holes so as to control the rate of flow from the chamber 28.

What is claimed is:
1. The method of welding a diaphragm assembly including removing or supplying gases in a welding chamber, comprising:
 (a) providing a housing having at least two sections each having at least one portal opening;
 (b) providing a diaphragm between the two sections; the two sections defining a cavity with the housing; the diaphragm dividing the housing cavity into two chambers;
 (c) disposing the diaphragm and housings into a welding chamber;
 (d) removing or supplying gases to the welding chamber at a rate sufficient to normally create an undesired unbalance pressure in said housing chambers;
 (e) welding the diaphragm and housings together; and
 (f) preventing said undesired unbalance of pressure by maintaining predetermined pressure relationships within and between the housing chambers during the removal or supply of gases by controlling the flow of gas through the respective portal openings to thereby retain the diaphragm in a predetermined position with reference to the housing before and after welding.

2. The method of removing or supplying gases, as recited in claim 1, wherein the step of maintaining the pressure relationships in the housing chambers includes dimensioning the portal openings so as to control the flow of gases and thereby maintain predetermined pressure relationships of the gases in one chaber with respect to the other chamber.

3. The method of removing or supplying gases, as recited in claim 2, wherein the step of providing portal openings includes dimensioning the cross-sectional area of each of the openings to be in the same proportions to one another as the volume of the respective chambers to which each portal is connected are to each other so that the rate of flow of gases through the portals is in the same proportion as the volumes of the chambers are to one another.

* * * * *